United States Patent
Liang

(10) Patent No.: US 7,424,111 B2
(45) Date of Patent: Sep. 9, 2008

(54) SYSTEM AND METHOD OF APPLYING PARITY BITS TO PROTECT TRANSMITTING AND RECEIVING DATA

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 828 days.

(21) Appl. No.: 10/919,303

(22) Filed: Aug. 17, 2004

(65) Prior Publication Data
US 2005/0047590 A1 Mar. 3, 2005

(30) Foreign Application Priority Data
Aug. 28, 2003 (TW) .............. 92123815 A

(51) Int. Cl.
*G09C 5/00* (2006.01)
*H04L 9/00* (2006.01)

(52) U.S. Cl. .............. 380/28; 714/752; 714/800

(58) Field of Classification Search .......... 380/28, 380/47, 268; 713/190, 201, 500, 600; 714/752, 714/800–801
See application file for complete search history.

(56) References Cited

U.S. PATENT DOCUMENTS

| 4,393,493 | A | * | 7/1983 | Edwards .............. 370/228 |
| 4,507,783 | A | | 3/1985 | Austin et al. |
| 4,661,980 | A | | 4/1987 | Byram |
| 6,397,367 | B1 | * | 5/2002 | Park et al. .............. 714/786 |
| 6,437,714 | B1 | * | 8/2002 | Kim et al. .............. 341/81 |
| 6,505,321 | B1 | * | 1/2003 | MacLellan et al. ........ 714/802 |
| 6,888,944 | B2 | | 5/2005 | Lotspiech et al. |
| 2003/0023918 | A1 | * | 1/2003 | Wu .............. 714/751 |
| 2003/0076870 | A1 | | 4/2003 | Moon et al. |
| 2003/0192006 | A1 | * | 10/2003 | Coakeley et al. ........ 714/776 |
| 2004/0187053 | A1 | * | 9/2004 | Sailer et al. .............. 714/724 |
| 2005/0047591 | A1 | * | 3/2005 | Liang .............. 380/28 |
| 2005/0050341 | A1 | * | 3/2005 | Liang .............. 713/190 |
| 2005/0050436 | A1 | * | 3/2005 | Liang .............. 714/801 |
| 2006/0218473 | A1 | * | 9/2006 | Kikuchi et al. .......... 714/776 |

FOREIGN PATENT DOCUMENTS

| JP | 08-08881 | 1/1996 |
| JP | 10-304324 | 11/1998 |
| JP | 2002-91712 | 3/2002 |

OTHER PUBLICATIONS

Callahan, R.W., Encrypting Decrypting Comunication Link, IBM TDB 05-77, May 1, 1977, pp. 4564-4568.*
Imai Hideki, "Coded Method in a Communication Line," *Information Theory*, Apr. 10, 1996, pp. 132-143, Tokyo, Japan, (abstract only).

* cited by examiner

*Primary Examiner*—Gilberto Barron, Jr.
*Assistant Examiner*—Hadi Armouche
(74) *Attorney, Agent, or Firm*—Bacon & Thomas, PLLC

(57) ABSTRACT

A system of applying a parity bit to protect transmitting and receiving data includes a transmitting-end device and a receiving-end device. The transmitting-end device includes a parity generator, a first parity location generator and a parity inserting unit which, when transmitting data, inserts a parity bit in the data to thus generate an encrypted data. The receiving-end device includes a second parity location generator and a parity removal unit that receives the encrypted data and removes Nth bit of the encrypted data in accordance with an inserting position N generated by the second parity location generator.

22 Claims, 5 Drawing Sheets

| The content og the first counter | The inserting position |
|---|---|
| C=1 | (3*1)mod 8 = 3 |
| C=2 | (3*2)mod 8 = 6 |
| C=3 | (3*3)mod 8 = 1 |
| C=4 | (3*4)mod 8 = 4 |
| C=5 | (3*5)mod 8 = 7 |
| C=6 | (3*6)mod 8 = 2 |
| C=7 | (3*7)mod 8 = 5 |
| C=8 | (3*8)mod 8 = 0 |
| C=9 | (3*9)mod 8 = 3 |

FIG. 4

SYSTEM AND METHOD OF APPLYING PARITY BITS TO PROTECT TRANSMITTING AND RECEIVING DATA

BACKGROUND OF THE INVENTION

1. Field of the Invention

The present invention relates to the technical field of data encryption for transmission and, more particularly, to a system and method of applying parity bits to protect transmitting and receiving data.

2. Description of Related Art

Due to the importance of intellectual properties, manufactories typically encrypt their intellectual property (IP) related data, including programs, off-line for data protection and store the data encrypted in a non-volatile memory or storage medium, such that an unauthorized person cannot restore the data even if he/she obtains the memory or storage medium with the data encrypted.

U.S. Pat. No. 6,408,073 granted to Hsu, et al. for an "Scramble circuit to protect data in a read only memory" discloses a scramble circuit for protecting data stored in a read only memory (ROM) by applying both a pseudo-random generator and an initial value seed1/seed2 to code ROM data and thus generates encoded data. However, since the scrambling technology uses random numbers as parameters, such a data protection method requires a synchronous random generator for decoding. It also needs many patterns of random numbers to effectively prevent an unauthorized person from retrieving data, programs, which means that a pseudo random generator for encoding and decoding needs highly complicated circuitry. Thus, the cost increases dramatically. On the contrary, a simpler pseudo random generator for encoding and decoding can be used to save the cost, but in this way, data and programs can be restored by an unauthorized person easily.

Therefore, it is desirable to provide an improved system and method to mitigate and/or obviate the aforementioned problems.

SUMMARY OF THE INVENTION

The object of the present invention is to provide a system and method of applying parity bits to protect transmitting and receiving data, thereby eliminating the need of complicated pseudo random generator in the prior art and accordingly saving cost, as well as reducing access cycles of processor due to simpler hardware for parity generation and removal, so as to enhance performance.

In accordance with one aspect of the present invention, there is provided a system of applying parity bits to protect transmitting and receiving data. The system includes a transmitting-end device and a receiving-end device. The transmitting-end device for transmitting data includes a parity generator, a first parity location generator and a parity inserting unit. The parity generator generates a parity bit in accordance with a data to be output, wherein the data has a plurality of bits. The first parity location generator generates an inserting position N (positive integer) for the parity bit through a first function generator in accordance with a first key and a first counter. The parity inserting unit inserts the parity bit in a position between (N−1)th- and Nth-bit of the data in accordance with the inserting position N generated by the first parity location generator, thereby generating an encrypted data. The receiving-end device for receiving data includes a second parity location generator and a parity removing unit. The second parity location generator generates the inserting position N for the parity bit through a second function generator in accordance with a second key and a second counter, wherein the second key has the same value as the first key and the second counter is synchronous with the first counter. The parity removing unit inputs the encrypted data and removes Nth bit from the encrypted data in accordance with the inserting position N generated by the second parity location generator.

In accordance with another aspect of the present invention, there is provided a method of applying parity bits to protect transmitting and receiving data between a transmitting-end device and a receiving-end device. The method includes: (A) generating a parity bit in accordance with a data to be transmitted by the transmitting-end device, wherein the data has a plurality of bits; (B) generating an inserting position N (positive integer) for the parity bit through a first function generation procedure in accordance with a first key and a first count procedure provided by the transmitting-end device; (C) generating an encrypted data by inserting the parity bit in a position between (N−1)th- and Nth-bit of the data in accordance with the inserting position N generated at step (B); (D) generating the inserting position N (positive integer) for the parity bit through a second function generation procedure in accordance with a second key and a second count procedure provided by the receiving-end device, wherein the second key is the same value as the first key and the second count procedure is synchronous with the first count procedure; (E) removing Nth bit of the encrypted data in accordance with the inserting position N generated at step (D).

Other objects, advantages, and novel features of the invention will become more apparent from the following detailed description when taken in conjunction with the accompanying drawings.

BRIEF DESCRIPTION OF THE DRAWINGS

FIG. 4 shows an example for increasing the randomness of the inserting position in accordance with the invention.

DETAILED DESCRIPTION OF THE PREFERRED EMBODIMENT

Figure 1:
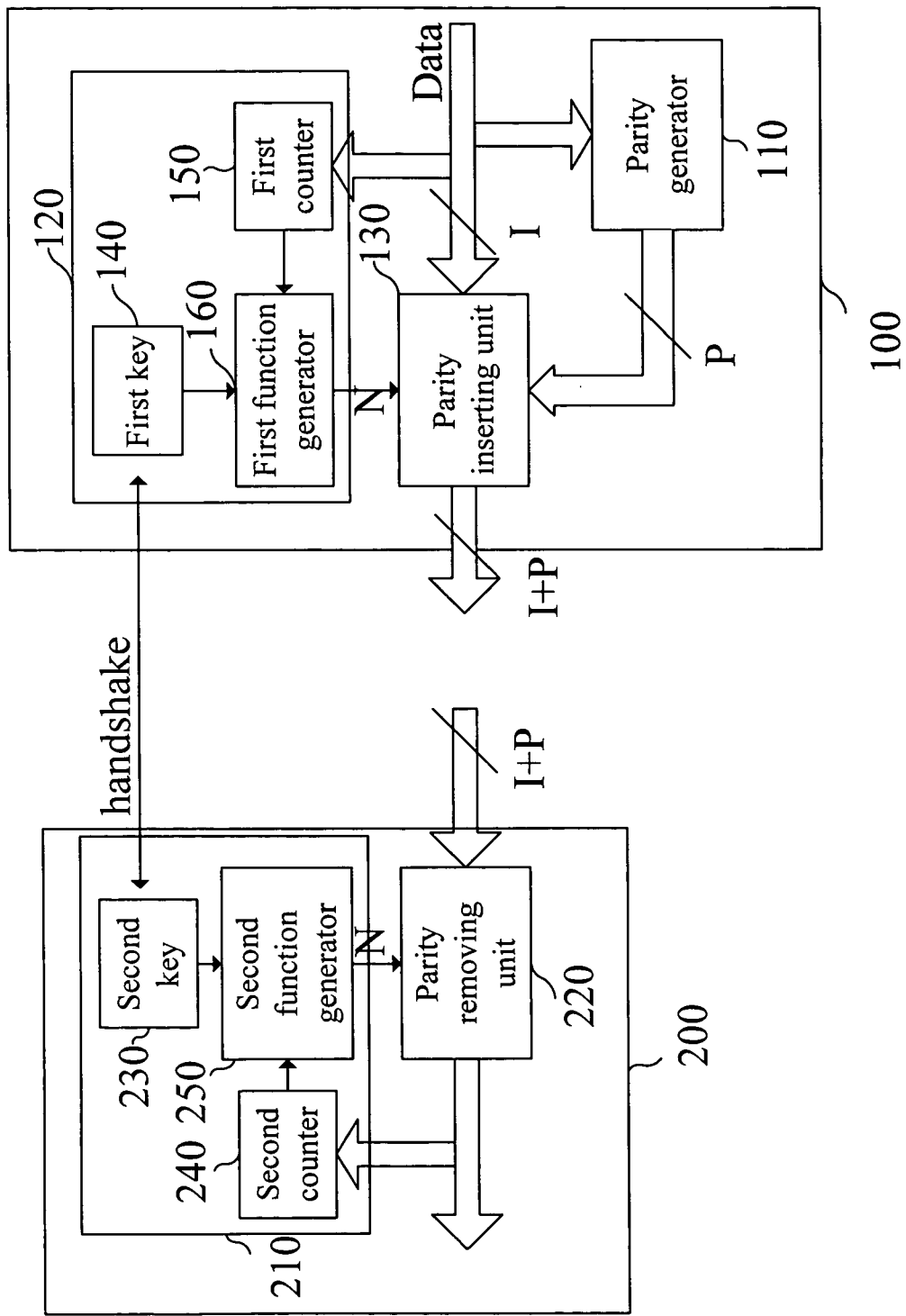
FIG. 1 is a block diagram of a system of applying parity bits to protect transmitting and receiving data in accordance with the invention.

FIG. 1 is a block diagram of a system of applying parity bits to protect data in accordance with the invention. In FIG. 1, the system includes a transmitting-end device 100 and a receiving-end device 200. The transmitting-end device 100 encrypts and transmits data while the receiving-end device 200 receives and decrypts the data.

As shown, the transmitting-end device 100 includes a parity generator 110, a first parity location generator 120 and a parity inserting unit 130. The parity generator 110 generates a parity bit in accordance with a data to be transmitted. The data has a plurality of bits. For illustrative purpose, in this embodiment, the data has thirty-two bits and the parity has one bit (P=1). The parity bit can be obtained by applying an XOR operation on the 32-bit data.

The first parity location generator 120 generates an inserting position N (positive integer) for the parity bit by a first function generator 160 in accordance with a first key 140 and a first counter 150. Namely, the integer N represents a position where the parity bit is disposed in the 32-bit data.

The first counter 150 records data amount transmitted by the transmitting-end device 100. The first function generator 160 generates the inserting position N by applying different functions to different transmitted data amount.

The parity inserting unit 130 inserts the parity bit in a position between (N−1)th- and Nth bit of the data in accordance with the inserting position N generated by the first parity location generator 120, thereby generating a 33-bit encrypted data.

Figure 3:
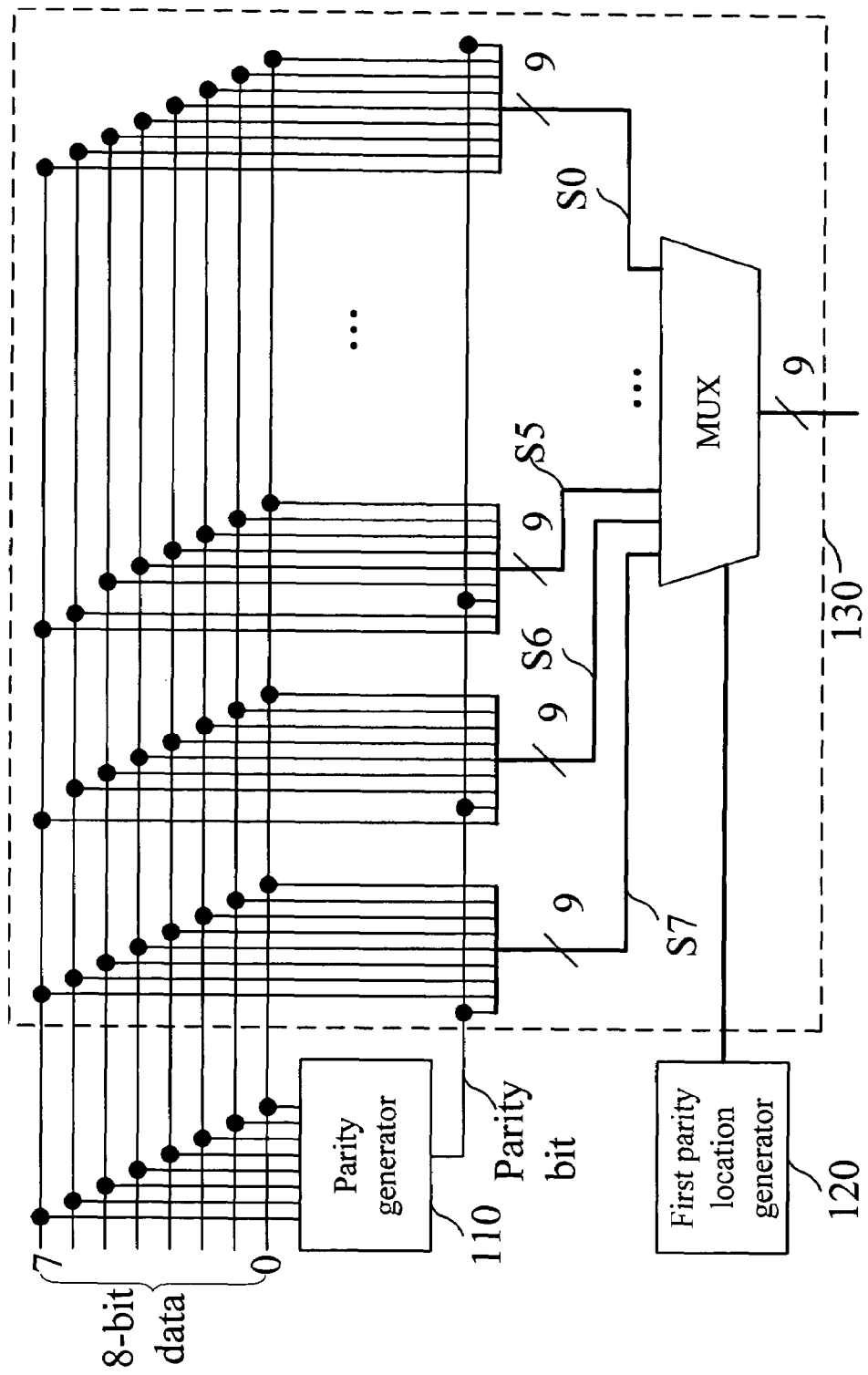
FIG. 3 is an exemplary circuit of a parity inserting unit in accordance with the invention.

FIG. 3 shows an exemplary circuit of the parity inserting unit 130. For illustrative purpose, an 8-bit data is given and accordingly, it can be extended up to 32-bit data in a similar circuit. Signal S7 represents a 9-bit encrypted data signal generated by inserting the parity bit in 8th bit of the 8-bit data, signal S6 represents a 9-bit encrypted data signal generated by inserting the parity bit in 7th bit of the 8-bit data, and so on.

The transmitting-end device 100 has to proceed handshake of the first key 140 and the second key 230 with the receiving-end device 200 before the 33-bit encrypted data is transmitted, i.e., the first key 140 and the second key 230 are determined in handshake by the transmitting-end device 100 and the receiving-end device 200.

After the handshake, the transmitting-end device 100 transmits the 33-bit encrypted data to the receiving-end device 200 via a bus.

Referring again to FIG. 1, the receiving-end device 200 includes a second parity location generator 210 and a parity removing unit 220. The second parity location generator 210 generates the inserting position N for the parity bit through a second function generator 250 in accordance with the second key 230 and a second counter 240. The integer N represents a position where the parity bit is disposed in the 33-bit encrypted data. In this case, the second key 230 has the same value as the first key 140 and the second counter 240 is synchronous with the first counter 150.

The second counter 240 records data amount received by the receiving-end device 200. The second function generator 250 generates the inserting position N by applying different functions to different received data amount.

Figure 2:
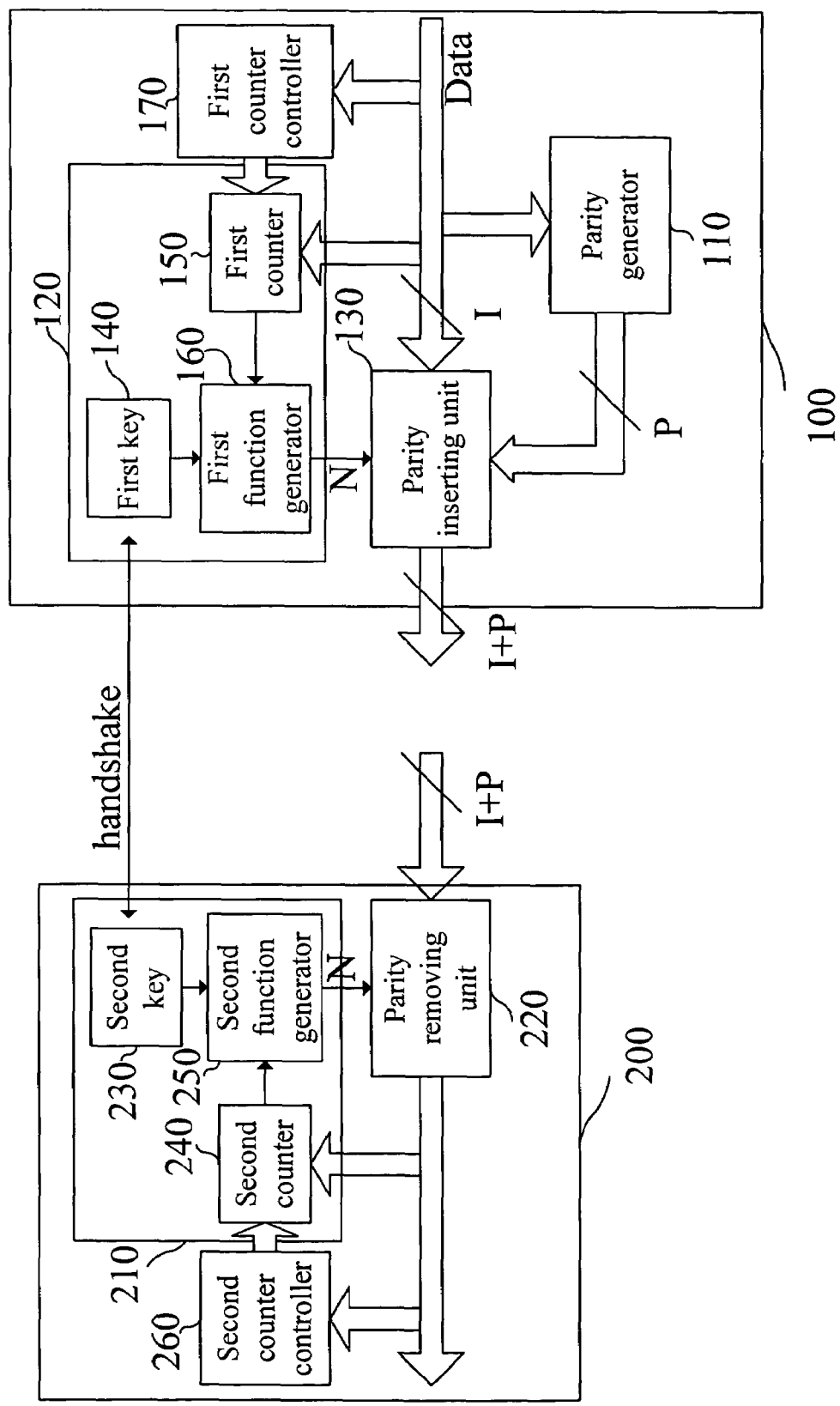
FIG. 2 is another block diagram of a system of applying parity bits to protect transmitting and receiving data in accordance with the invention.

FIG. 2 is another embodiment of the invention. As shown, the counter is operated depending on data content, and the first counter 150 and the second counter 240 are synchronized by using a count of transmitting and receiving data as a synchronization signal. For example, when 255th record of data is counted concurrently by the first counter 150 and the second counter 240, the two counters 150 and 240 are reset to 0 at the same time.

Alternatively, the first counter 150 and the second counter 240 are synchronized by using a predefined data type of transmitting and receiving data as a synchronization signal. For example, if the predefined data type is a form of {000 . . . 0}, when the first counter controller 170 and the second counter controller 260 both detect to a certain data to have all bits of 0, the two counters 150 and 240 are reset to 0 at the same time.

The predefined data type can alternatively be a value of 1 located in a transmitting and receiving data at its least significant bit (LSB), to accordingly synchronize the first counter 150 and the second counter 240. For example, when the first counter controller 170 and the second counter controller 260 detect a data with the LSB of 1, the first counter 150 and the second counter 240 adds the count by 1.

Therefore, it is known that the data content can be applied to control the counters and further control parity location changes generated by the function generators 160 and 250.

The integer N generated by the first function generator 160 and the second function generator 250 respectively can alternatively be applied to a modulus operation for generating the inserting position. The integer N generated by the first function generator 160 and the second function generator 250 respectively can also be rotated left for generating the inserting position, or be rotated right for generating the inserting position. As such, randomness of the integer N representing the inserting position is increased and accordingly the inserting position is hard to be obtained by reverse inference.

Without the first counter 150, the inserting position is only dependent on the first key 140, and it is easy for a hacker to find the inserting position via try and errors. FIG. 4 shows an example for increasing the randomness of the inserting position in accordance with the invention. As shown, the first key 140 is equal to 3 (K=3) and the first function generator is describing by the equation (K*C) mod 8, wherein K is the first key 140 and C is the content of first counter 150 which records data amount transmitted by the transmitting-end device 100. As shown, the inserting positions are changed randomly.

Figure 5:
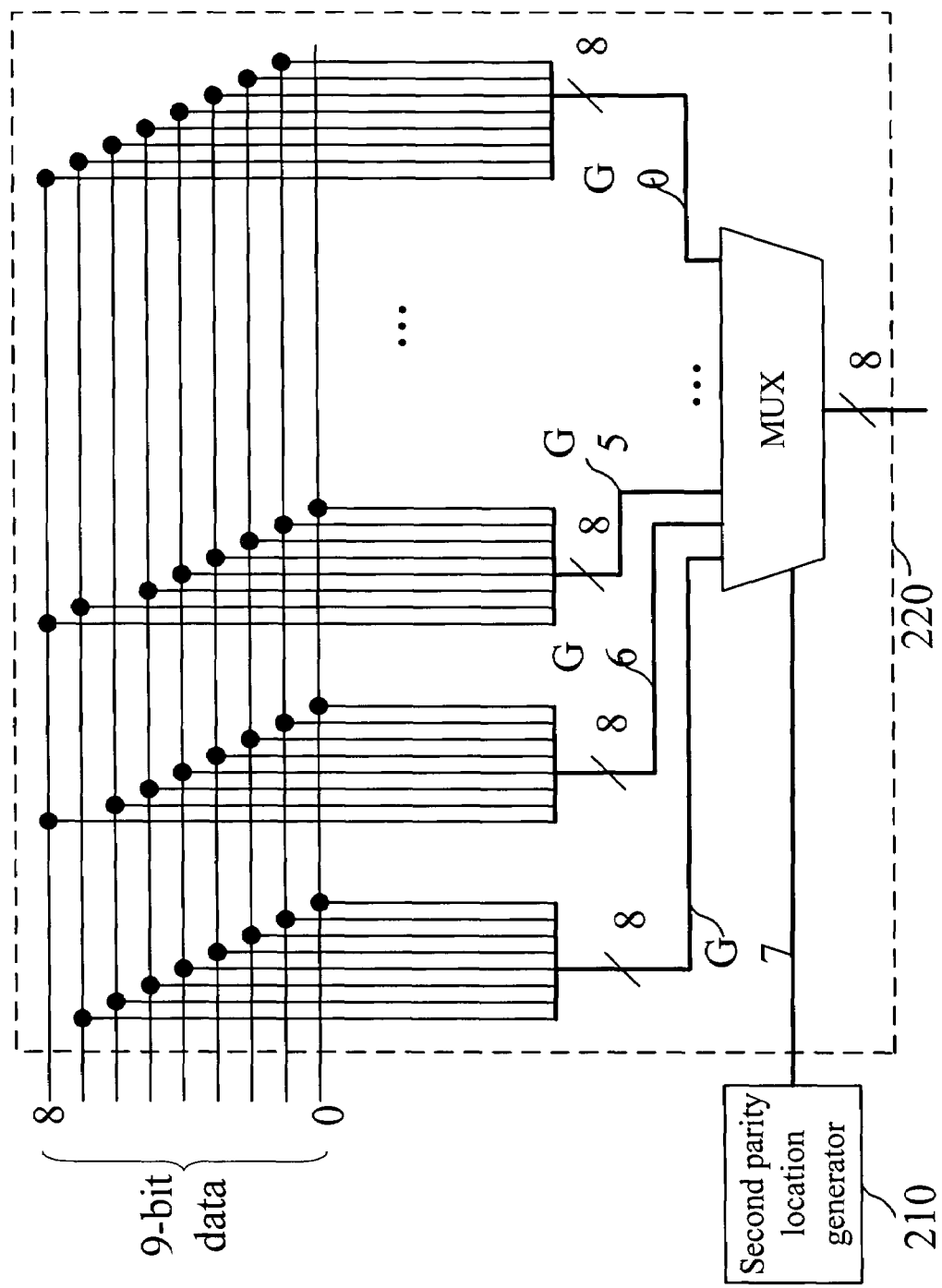
FIG. 5 is an exemplary circuit of a parity removing unit in accordance with the invention.

FIG. 5 shows an exemplary circuit of the parity removing unit 220. As shown, for illustrative purpose, a 9-bit encrypted data is given and accordingly, it can be extended up to 32-bit encrypted data in a similar circuit. Signal G7 represents a 8-bit data signal generated after the parity bit at 8th bit of the 9-bit encrypted data is removed, signal G6 represents a 8-bit data signal generated after the parity bit at 7th bit of the 9-bit encrypted data is removed, and so on.

In view of foregoing, it is known that the invention does not need to use complicated pseudo random generator and thus can save cost. In addition, hardware for generating and removing parity bits is very simple, which spends less time in encryption processing and has better performance than the prior art.

Although the present invention has been explained in relation to its preferred embodiment, it is to be understood that many other possible modifications and variations can be made without departing from the spirit and scope of the invention as hereinafter claimed.

What is claimed is:

1. A system of applying parity bits to protect transmitting and receiving data, comprising:
   a transmitting-end device for transmitting data, including:
   a parity generator, which generates a parity bit in accordance with a data to be transmitted, wherein the data has a plurality of bits,
   a first parity location generator, which generates an inserting position N (positive integer) for the parity bit through a first function generator in accordance with a first key and a first counter, and
   a parity inserting unit, which inserts the parity bit in a position between (N−1)th- and Nth-bit of the data in accordance with the inserting position N generated by the first parity location generator, thereby generating an encrypted data; and
   a receiving-end device for receiving the data, including:
   a second parity location generator, which generates the inserting position N (positive integer) for the parity bit through a second function generator in accordance with a second key and a second counter, wherein the second key has the same value as the first key and the second counter is synchronous with the first counter, and a parity removing unit, which inputs the encrypted data and removes Nth bit of the encrypted data input in accordance with the inserting position N generated by the second parity location generator.

2. The system as claimed in claim 1, wherein the second counter and the first counter are synchronized by using a number of transmitting and receiving data as a synchronization signal.

3. The system as claimed in claim 1, wherein the second counter and the first counter are synchronized by using a predefined data type of transmitting and receiving data as a synchronization signal.

4. The system as claimed in claim 3, wherein the predefined data type is {000 . . . 0}, and the synchronization signal is sent to synchronize the first counter and the second counter when {000 . . . 0} is met.

5. The system as claimed in claim 3, wherein the predefined data type is a special bit combination of partial or entire of the transmitting and receiving data, and the synchronization signal is sent to synchronize the first counter and the second counter when the special bit combination is met.

6. The system as claimed in claim 5, wherein the first counter and the second counter are synchronized by using a count of transmitting and receiving data as a synchronization signal.

7. The system as claimed in claim 1, wherein the inserting position is generated by further applying a same integer generated by the first and second function generators to a modulus operation respectively.

8. The system as claimed in claim 1, wherein the inserting position is generated by further applying a same integer generated by the first and second function generators to a function of left rotation respectively.

9. The system as claimed in claim 1, wherein the inserting position is generated by further applying a same integer generated by the first and second function generators to a function of right rotation respectively.

10. The system as claimed in claim 1, wherein the first counter records data amount transmitted by the transmitting-end device and the second counter records data amount received by the receiving-end device.

11. The system as claimed in claim 1, wherein the first key and the second key are determined in handshake by the transmitting-end device and the receiving-end device.

12. The system as claimed in claim 1, wherein the data has 32 bits.

13. A method of applying parity bits to protect transmitting and receiving data between a transmitting-end device and a receiving-end device, comprising the steps of:
  (A) generating a parity bit in accordance with a data to be transmitted by the transmitting-end device, wherein the data has a plurality of bits;
  (B) generating an inserting position N (positive integer) for the parity bit through a first function generation procedure in accordance with a first key and a first count procedure provided by the transmitting-end device;
  (C) generating an encrypted data by inserting the parity bit in a position between (N−1)th- and Nth-bit of the data in accordance with the inserting position N generated at step (B);
  (D) generating the inserting position N (positive integer) for the parity bit through a second function generation procedure in accordance with a second key and a second count procedure provided by the receiving-end device, wherein the second key is the same value as the first key and the second count procedure is synchronous with the first count procedure; and
  (E) removing Nth bit of the encrypted data in accordance with the inserting position N generated at step (D).

14. The method as claimed in claim 13, wherein the second count procedure and the first count procedure are synchronized by using a number of transmitting and receiving data as a synchronization signal.

15. The method as claimed in claim 13, wherein the second count procedure and the first count procedure are synchronized by using a predefined data type of transmitting and receiving data as a synchronization signal.

16. The method as claimed in claim 15, wherein the predefined data type is {000 . . . 0}, and the synchronization signal is sent to synchronize the first count procedure and the second count procedure when {000 . . . 0} is met.

17. The method as claimed in claim 15, wherein the predefined data type is a special bit combination of partial or entire of the transmitting and receiving data, and the synchronization signal is sent to synchronize the first count procedure and the second count procedure when the special bit combination is met.

18. The method as claimed in claim 17, wherein the first count procedure is performed by a first counter in the transmitting-end device, the second count procedure is performed by a second counter in the receiving-end device, and the first count procedure and the second count procedure are synchronized by concurrently adding the two counters by 1.

19. The method as claimed in claim 13, wherein in steps (B) and (D), the inserting position is generated by further applying a same integer number generated by the first and second function generation procedures to a modulus operation respectively.

20. The method as claimed in claim 13, wherein in steps (B) and (D), the inserting position is generated by further applying a same integer number generated by the first and second function generation procedures to a function of left rotation respectively.

21. The method as claimed in claim 13, wherein in steps (B) and (D), the inserting position is generated by further applying a same integer number generated by the first and second function generation procedures to a function of right rotation respectively.

22. The method as claimed in claim 13, wherein the data has 32 bits.

* * * * *